Feb. 16, 1926.   1,572,903
A. D. ROBBINS
DRIVE FOR MOTOR VEHICLES
Filed August 6, 1925   2 Sheets-Sheet 2
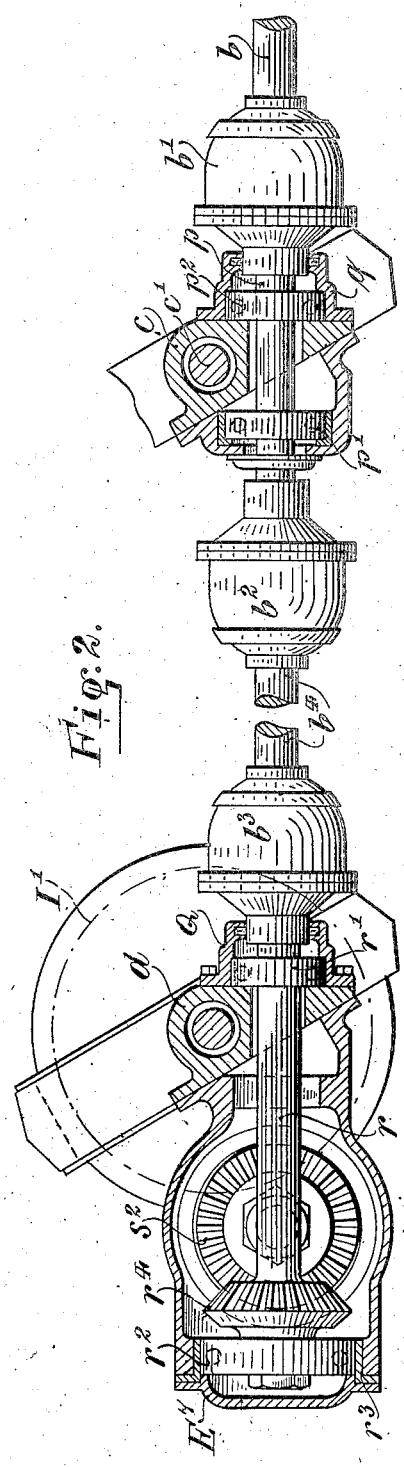
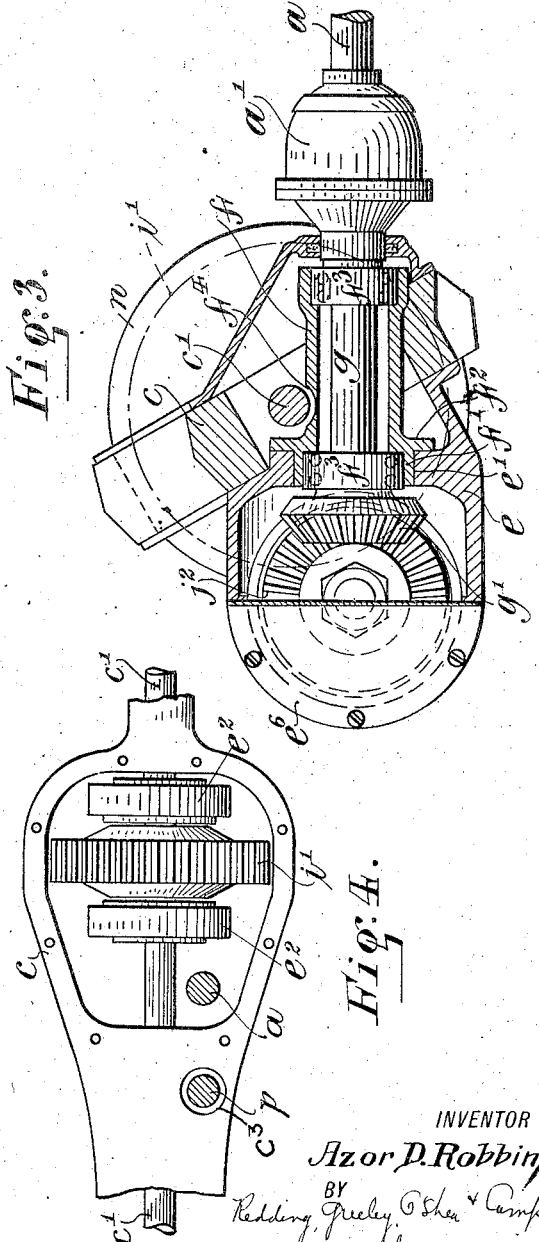
INVENTOR
Azor D. Robbins
BY
Redding, Greeley, O'Shea & Campbell
his ATTORNEYS Patented Feb. 16, 1926.

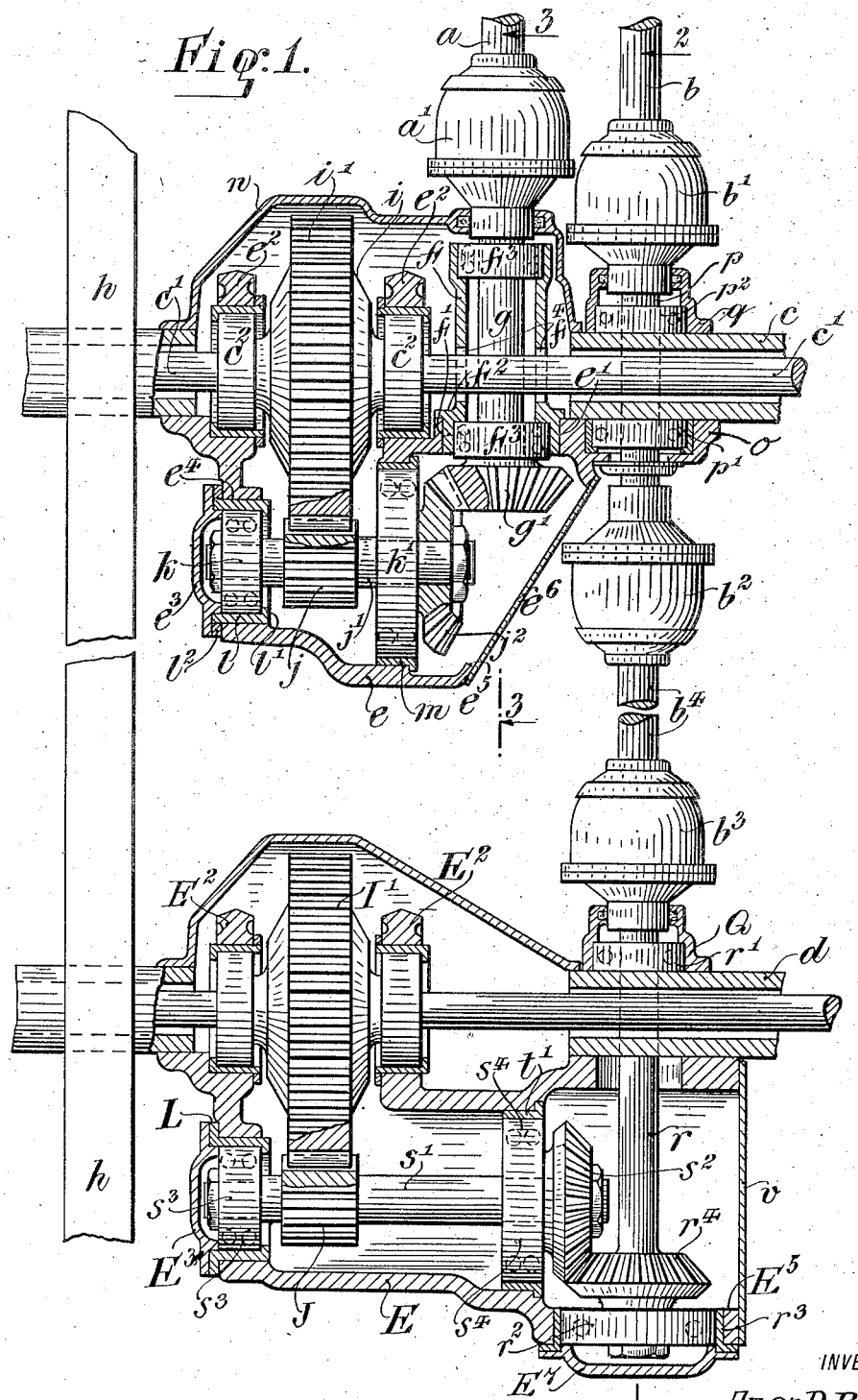

1,572,903

UNITED STATES PATENT OFFICE.

AZOR D. ROBBINS, OF NEW YORK, N. Y., ASSIGNOR TO INTERNATIONAL MOTOR COMPANY, OF NEW YORK, N. Y., A CORPORATION OF DELAWARE.

DRIVE FOR MOTOR VEHICLES.

Application filed August 6, 1925. Serial No. 48,490.

*To all whom it may concern:*

Be it known that I, AZOR D. ROBBINS, a citizen of the Commonwealth of Australia, residing in the borough of Manhattan, of the city of New York, in the State of New York, have invented certain new and useful Improvements in Drives for Motor Vehicles, of which the following is a specification, reference being had to the accompanying drawings, forming a part hereof.

This invention relates to drives for motor vehicles and more particularly to dual rear axle drives of the kind in which the driving torque from the prime mover is sub-divided and transmitted rearwardly to the respective driving axles by separate propeller shafts. The invention has for its particular object to provide a construction wherein the differential gearing for the respective axles shall be disposed to one side of the longitudinal median line of the vehicle which at the same time shall be practical from the standpoint of manufacture and assembly and disassembly. To this end a dead axle of the banjo type is formed with a portion of greatest interior dimension offset from the center line of the vehicle and is provided with an independent passage for one of the propeller shafts. A further object of the invention is to provide a construction which may be readily assembled and disassembled for replacement and repair in an easy and efficient manner. To this end short shaft sections are disposed in bearings removably connected in the housings associated with the banjo axles for the transmission of driving forces in such manner that the removal of one shaft section may uncover another shaft section to facilitate its removal. These and other objects of the invention and the means for their attainment will be more apparent from the following detailed description of a preferred embodiment thereof in which:

Figure 1 is a view in plan showing the rear drive according to the present invention as applied to dual rear driving axles.

Figure 2 is a longitudinal vertical sectional view taken in the plane indicated by the line 2—2 in Figure 1 and looking in the direction of the arrows.

Figure 3 is a longitudinal vertical sectional view taken in the plane indicated by the line 3—3 in Figure 1 and looking in the direction of the arrows and showing the gearing of the front driving axle.

Figure 4 is a view showing the banjo axle casting applicable for both forwardly and rearwardly disposed axles according to the present invention.

In the application of Gabriel Midboe No. 695,891 dated February 29, 1924, there is disclosed a drive for motor vehicles of the dual rear axle type in which the driving torque from the engine is divided by a differential between two rearwardly extending propeller shafts. The present invention contemplates the utilization of a power dividing unit embodying the broad principle outlined in said patent. From the power dividing unit the driving torque is transmitted rearwardly in equal proportions by the propeller shafts $a$ and $b$ which are connected, respectively, as by universal joints $a'$, $b'$ to short shaft sections journaled in the dead axle of the forwardly disposed driving axle. The banjo forging of the forwardly disposed rear driving axle is indicated in general at $c$ and the banjo axle section of the rearwardly disposed driving axle is indicated in general at $d$. Both banjo axles take in form the general shape indicated in Figure 4. Rearwardly of dead axle $c$ there is carried a housing portion $e$ and supported within housing $e$ is a bearing support $f$ for a short shaft section $g$ connected at its forward end with the universal joint $a'$. Bearing support $f$ is substantially cylindrical in form and is formed with a cylindrical seat portion $f'$ seating in a cylindrical portion $a'$ of the housing and prevented from displacement by a flange $f^2$. Ball bearings $f^3$ are carried with the support $f$ and within these bearings rotates the shaft $g$ which carries at its rearward end a bevel pinion $g'$ as will be obvious from an inspection of Figure 3. The shaft $g$ is disposed immediately below the live axle $c'$, a portion of the support $f$ being removed as at $f^4$ to provide a clearance for the shaft. To one side of the longitudinal median line of the vehicle and adjacent the side frame member $h$ thereof a differential $i$ is interposed, the master or ring gear $i'$ of which meshes with a pinion $j$ carried upon a transversely extending shaft $j'$ journaled in ball bearings $k$, $k'$ supported in removable bearing supports $l$, $m$, carried with the housing $e$. The shaft $j'$ carries at its inner end a bevel gear $j^2$ adapted to mesh with the bevel pinion $g'$ whereby driving torque from the propeller shaft is transmitted by means of the short shaft section $g$, bevel pinion $g'$, bevel gear $j^2$, shaft $j'$ and pinion $j$ to the ring gear $i'$ of the differential from whence the power is transmitted to the axle sections $c'$, $C'$. In the interest of disassembly, bearings $C^2$ and $c^2$ for the axle sections are removably secured to the housing $e'$ by means of segmental supports $e^2$, $e^2$ and the front face of the aperture in the banjo housing is adapted to be closed by a cover section $n$. From an inspection of Figure 1 it will be observed that the bearing support $l$ is formed with an inwardly extending flange $l'$, at the inner side thereof and carries an outwardly extending flange $l^2$ which may be integral therewith or threaded thereon and which is adapted to overlie the outer face of the aperture in the housing $e$ whereby the bearing may be readily inserted. A cover or cap $e^3$ is provided to close the aperture $e^4$ for the bearing support. Inwardly the housing $e$ is formed with an opening $e^5$ closed by a cover plate $e^6$ through which the shafts $j'$ and $g$ may be removed. Adjacent housing $e$ there is formed a housing portion or cap $o$ adapted to form a bearing support for a short shaft $p$ passing through the independent aperture $c^3$ in the banjo housing which with the housing $e$ forms the aperture $e^5$ through which the shafts $g$ and $j'$ may be removed. A similar housing $q$ is illustrated as secured to the different axle forwardly thereof to form a support for the bearing $p^2$ therein.

Rearwardly, of course, the stub shaft $p$ is connected to a universal joint $b^2$ which in turn is connected to a universal joint $b^3$ by means of a propeller shaft section $b^4$, the universal joint being in turn operatively connected with a short shaft section $r$ journaled in bearings $r'$ in a closure Q carried with the forward end of the banjo $d$. The rear end of the shaft is journaled in bearings $r^2$ carried in a removable bearing support $r^3$ supported in a housing E and the end of the shaft is covered by a cover plate $E^7$. A similar differential whereof the ring gear is indicated at $I'$ is provided between the axle sections for the rearwardly disposed axle which are similarly supported in bearings removably carried by means of the supports $E^2$ and the ring gear $I'$ meshes with a pinion J carried upon a shaft $s'$ having at one end a bevel pinion $s^2$ meshing with the bevel pinion $r^4$ carried with the shaft $r$. Shaft $s'$ is supported in bearings $s^3$ and $s^4$, respectively, which are carried in removable bearing supports $t'$ and L, respectively. Bearing support L is substantially similar, in every respect to bearing support $l$ in the housing $e$ and a closure $E^3$, is provided for the opening. A closure plate $v$ is also provided for an opening $E^5$ formed in housing $e$ through which the shaft $s'$ is removed.

What I claim is:

1. In a dual rear axle drive, the combination with a pair of rearwardly extending propeller shafts, of housings for the respective axles, short shaft sections journaled in one of the housings and connected with the respective propeller shafts, a transversely extending short shaft carried with the housing, a differential gear, operative connections between the transverse shaft and the differential gear, operative connections between one of the short shaft sections and the driven shaft.

2. In a dual rear axle drive, the combination with a pair of rearwardly extending propeller shafts, of housings for the respective axles, short shaft sections journaled in one of the housings and connected with the respective propeller shafts, a transversely extending short shaft carried with the housing, a differential gear, operative connections between the transverse shaft and the differential gear, operative connections between one of the short shaft sections and the driven shaft, a short shaft section carried with the second axle, operative connections between said short shaft sections, a transversely extending shaft journaled in the housing, operative connections between said shafts and operative connections between said short shaft and differential.

This specification signed this 22nd day of June, A. D. 1925.

AZOR D. ROBBINS.